United States Patent [19]

Simjian

[11] Patent Number: 4,887,836
[45] Date of Patent: Dec. 19, 1989

[54] CART WITH FOLDABLE SIDE PANELS

[75] Inventor: Luther G. Simjian, Fort Lauderdale, Fla.

[73] Assignee: Command Automation, Inc., Fort Lauderdale, Fla.

[21] Appl. No.: 238,566

[22] Filed: Aug. 31, 1988

[51] Int. Cl.$^4$ ............................................. B62B 3/02
[52] U.S. Cl. ..................................... 280/651; 296/27; 280/47.371
[58] Field of Search ............ 280/639, 656, 659, 47.34, 280/47.371, 37, 40, 87.01, 651; 296/27, 26, 50

[56] References Cited

U.S. PATENT DOCUMENTS

| | | | |
|---|---|---|---|
| 2,563,995 | 8/1951 | East | 280/639 |
| 2,767,996 | 10/1956 | Seyforth | 280/40 |
| 3,236,539 | 2/1966 | Ketterer | 280/87.01 |
| 3,403,924 | 10/1968 | Oliveira | 280/656 |
| 4,253,677 | 3/1981 | Wissler | 280/656 |
| 4,768,806 | 9/1988 | Tetreault | 280/656 |
| 4,811,968 | 3/1989 | Bolden | 280/47.26 |

FOREIGN PATENT DOCUMENTS 1593586  7/1981  United Kingdom ................ 280/639

Primary Examiner—David M. Mitchell
Assistant Examiner—Tamara L. Finlay

[57] ABSTRACT

A cart with foldable side panels for transporting groceries and similar articles is shown. The cart includes a handle movable between a stowage position and an extended position for pulling the cart. A linkage couples the motion of the handle between its stowage position and its extended position to the side panels for causing the side panels to be in their folded position, resting upon the flatbed of the cart, when the handle is in its stowed position, and the side panels to be in their upstanding or erected position when the handle is in its extended position.

16 Claims, 5 Drawing Sheets

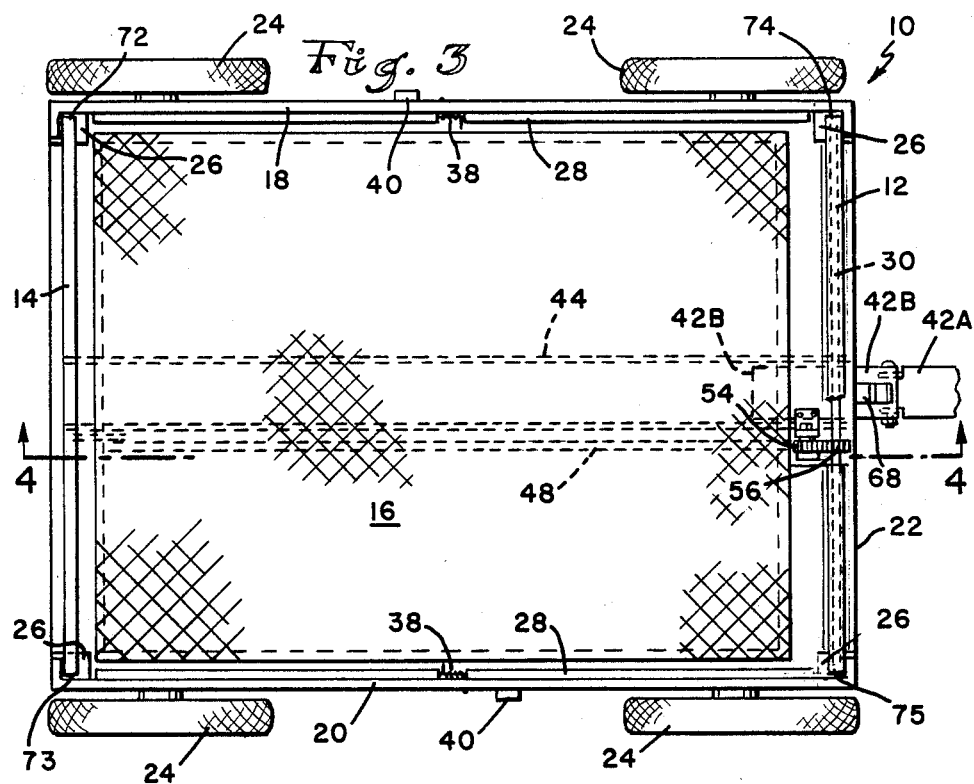
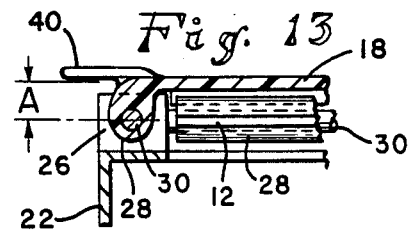
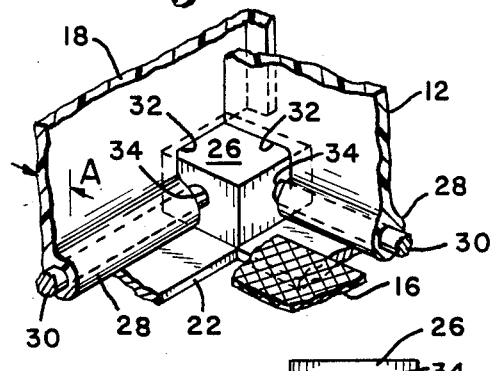
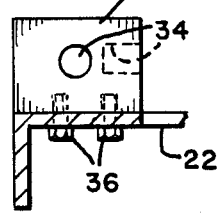
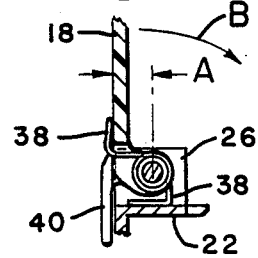

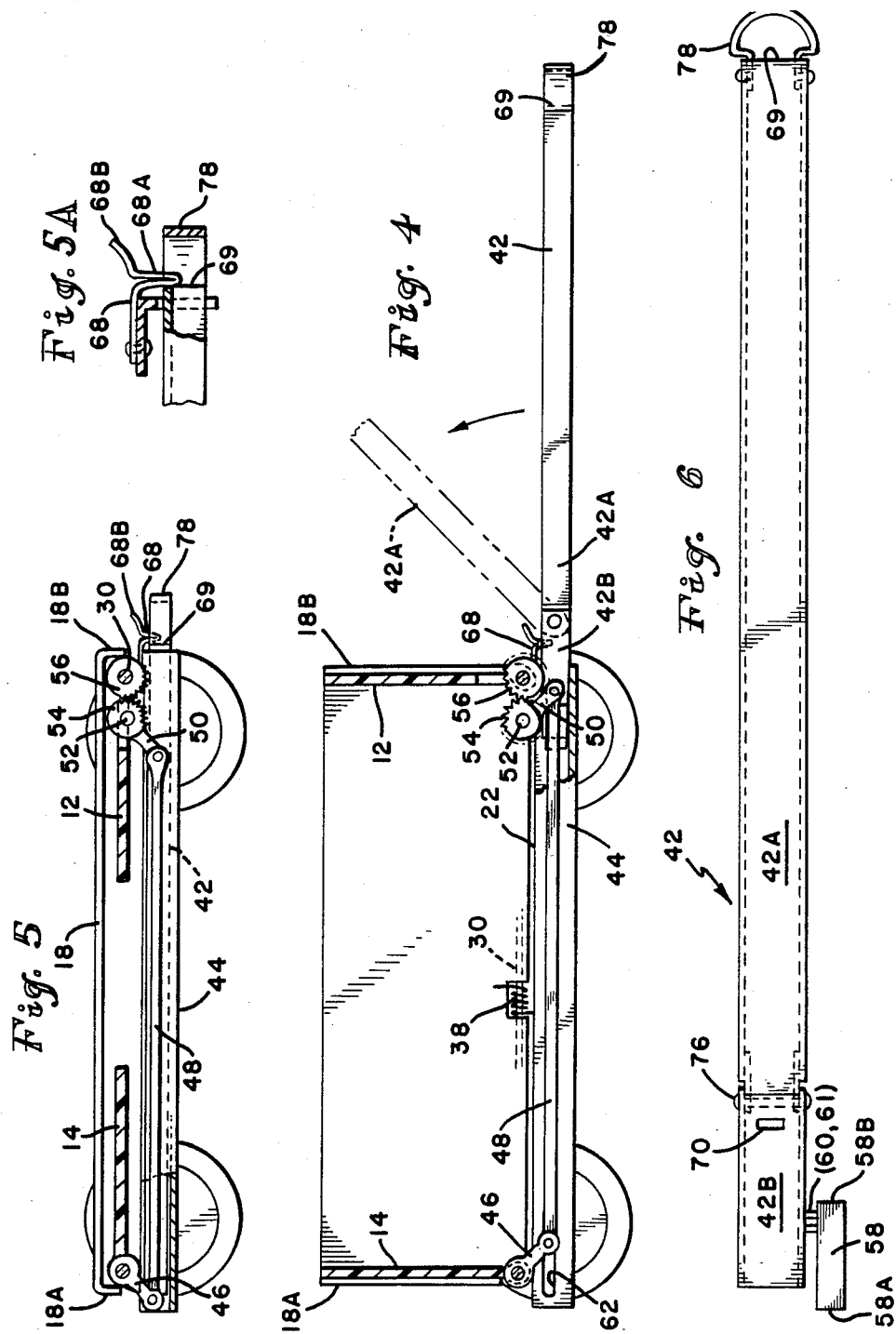

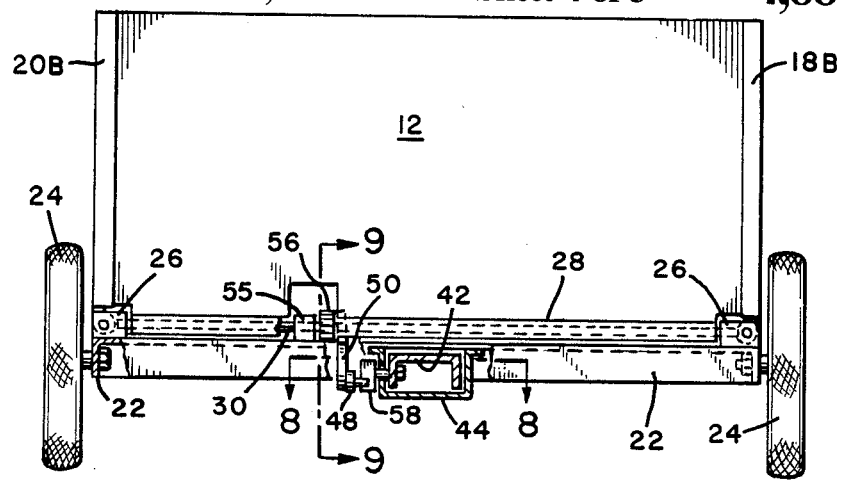
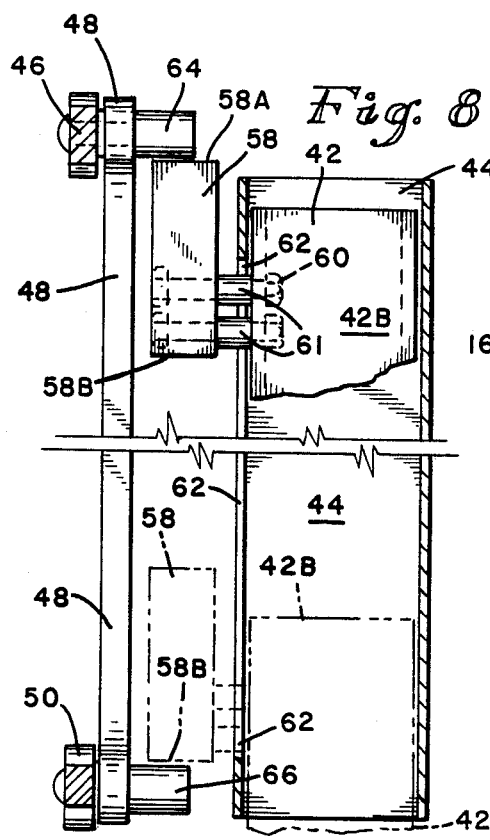
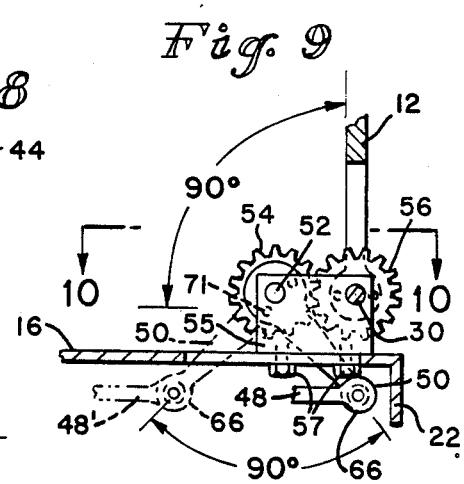
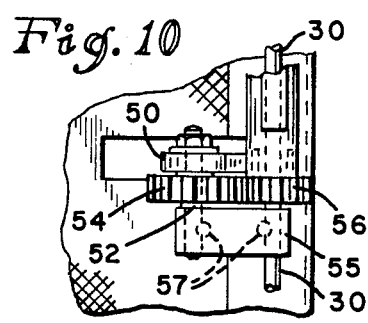

CART WITH FOLDABLE SIDE PANELS

BACKGROUND OF THE INVENTION

This invention relates to a cart or wagon for transporting groceries or similar products and, more specifically, refers to a cart or wagon with foldable side panels so that the cart, when not in use, assumes a smaller volume for compact storage in the trunk of an automobile or in the closet of a house or an apartment.

Carts having various foldable portions are shown, for instance, in the prior art listed below:

| U.S. Pat. No. | DATE OF ISSUE | INVENTOR |
|---|---|---|
| 908,472 | Jan. 5, 1909 | Lyons |
| 1,066,489 | Jul. 8, 1913 | Golden |
| 2,371,472 | Mar. 13, 1945 | Ruff et al |
| 2,456,013 | Dec. 14, 1948 | Nelson |
| 2,563,995 | Aug. 14, 1951 | East |
| 2,767,996 | Oct. 23, 1956 | Seyforth |
| 2,777,708 | Jan. 15, 1957 | Patterson |
| 2,879,072 | Mar. 24, 1959 | Rear et al |
| 3,451,690 | Jun. 24, 1969 | Cravens |
| 4,746,140 | May 24, 1988 | Kassai |

SUMMARY OF THE INVENTION

According to this invention there is disclosed a cart for easily transporting groceries or the like from an automobile to the inside of a house or apartment, the cart being adapted to be carried in the trunk or the passenger compartment of an automobile by virtue of foldable side panels forming an important part of the cart. As a novel feature of this invention, the folding of the side panels is controlled by a reciprocatingly moveable handle used for pulling the cart, the handle being movable between a stowage position and an extended position. Responsive to moving the handle from its extended position to its stowage position, the side panels move from an upstanding position to their folded position and responsive to moving the handle from its stowage position to its extended position, the side panels move from the folded position to the upstanding position. Other novel and important features of the present invention will become more clearly apparent from the following description when taken in conjunction with the accompanying drawings.

BRIEF DESCRIPTION OF THE DRAWINGS

FIG. 3 is a plan view of the cart shown in FIGURE 1;

FIG. 4 is a sectional view along line 4—4 of FIG. 3;

FIG. 5 is a view similar to FIG. 4, but the side panels being folded;

FIG. 5A is an enlarged view, partly in section, showing a spring detent for the handle;

FIG. 6 is a plan view of the handle;

FIG. 7 is a front elevational view, partly in section, of the cart as shown in FIG. 1;

FIG. 8 is an enlarged sectional view taken along line 8—8 in FIG. 7;

FIG. 9 is a sectional view taken along line 9—9 in FIG. 7;

FIG. 10 is a plan view taken along line 10-10 in FIG. 9;

FIG. 11 is a perspective view, partly in section, of the corner journal block and relative positioning of the side panels;

FIG. 12 is an elevational view, partly in section, of the journal block;

FIG. 13 is a view similar to FIG. 12, showing fragmentary portions of the side panels in folded position;

FIG. 14 is a sectional view, similar to FIG. 13, showing the spring loaded side panel in its upstanding position.

DETAILED DESCRIPTION OF THE INVENTION

Figure 1:
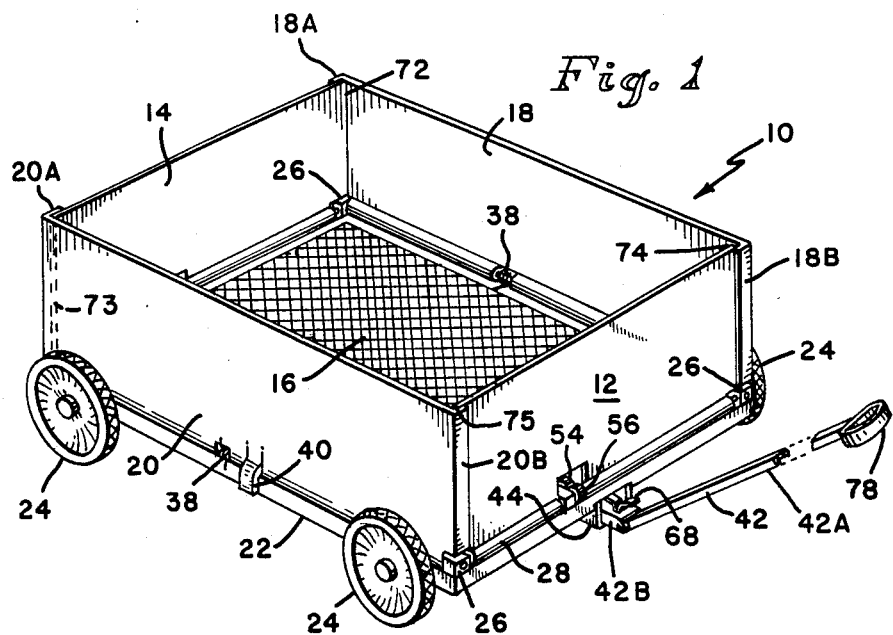
FIG. 1 is a perspective view of the cart showing the side panels upstanding, the erected position, and the handle of the cart in the extended position.
Figure 2:
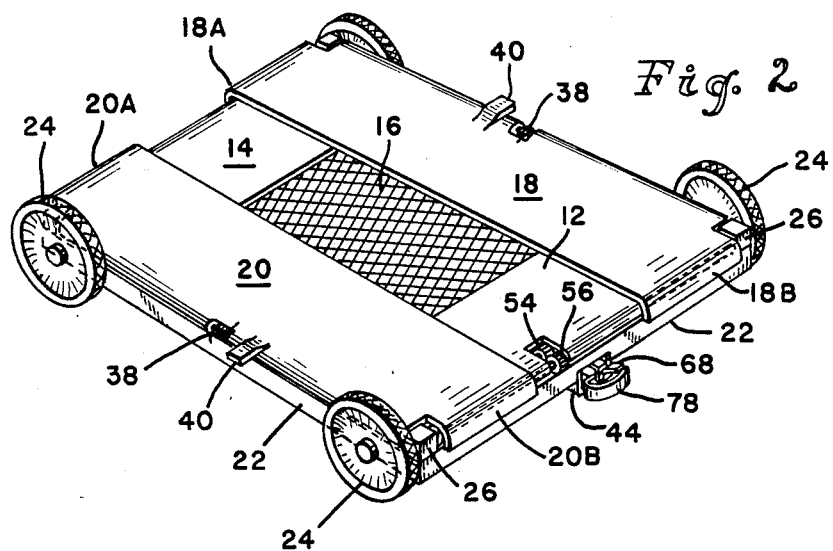
FIG. 2 is a perspective view of the cart with the side panels in the folded position and the handle in its stowed position.

With reference to the figures and FIGURE 1 in particular, the cart with foldable side panels, generally indicated by reference numeral 10, is constructed with a front side panel 12 and a rear side panel 14 adapted to be foldable inwardly simultaneously for lying flat upon the flatbed 16. As is readily apparent, the four sided cart is provided also with side panels 18 and 20 which are constructed to fold inwardly to lay atop the front and rear panels 12 and 14 in a flat or folded position as best seen in FIG. 2. As shown in FIG. 1, the four side panels 12, 14, 18 and 20 are upstanding, considered the erected position whereas in FIG. 2 the panels are shown in their folded position.

The flatbed 16 of the cart can be made of any suitable material, such as aluminum mesh as illustrated, for lightness. The flatbed 16 is mounted upon a suitable four sided frame 22 to which a set of wheels 24 are secured. Instead of wheels, casters can be used. The frame 22 also carries a respective journal block 26 at each corner for supporting pivoting means for the side panels 12, 14, 18 and 20 to cause the latter to be movable between the folded and erected positions.

In a typical embodiment, the side panels 12, 14, 18 and 20 are made of plastic material, each panel having an enlarged lower edge 28 in which a rod 30 is provided for supporting such panel and causing each panel to be pivotable. As best seen in FIG. 11, the lower ends of each side panel are undercut, see numeral 32, to clear the journal block 26 which receives the ends of the rods 30 in respective holes 34. After insertion of the rod ends into the holes 34 of the journal block 26, the respective journal block is secured to the frame 22 by screws 36 as seen in FIG. 12.

The panels 18 and 20, furthermore, are formed With enlarged lower edges 28 which are offset with respect to the center of pivot rod 30 as illustrated by dimension A in FIGS. 11, 13 and 14. This offset is for the purpose of allowing side panels 18 and 20 to lie parallel and flat upon the panels 12 and 14 when in folded position as seen in FIGS. 2 and 13. The side panels 18 and 20 are each provided with a torsion spring 38 which serves to urge each such panel inwardly toward its folded position, see arrow B in FIG. 14. Also, each side panel 18 and 20 is formed with a finger stop 40, which when the respective side panel is in the upstanding position, abuts against the frame 22 to prevent further pivotal motion of the biased side panel past its erected position. As seen, the rotational motion of each side panel is substantially ninety degrees.

The cart is provided with a handle 42, particularly shown in FIGS. 1, 4 and 6, which is received within a channel 44 secured beneath the frame 22 when the handle is in its retracted or stowage position underneath the flatbed 16 a seen in FIGS. 2 and 5. Movement of the handle 4 from its stowage position to its extended position (FIG. 4) causes the side panels to move from their folded position to their erected position and vice versa. More specifically, the shaft or rod 30 which pivotally supports the rear side panel 14 carries a first crank arm 46, the free end of which is pivotally coupled to one end of a link 48 which is located adjacent to and runs parallel to the channel 44 as shown in FIGS. 5 through 8. The other end of the link is pivoted to the end of a second crank arm 50 secured to a short shaft 52. A first gear 54 is mounted upon the shaft 52 and meshes with a second gear 56 which is mounted on the pivot rod 30 associated the front side panel 12. It will become apparent with reference to FIGS. 4 and 5, that motion of the link 48 in a foward direction from the position shown in FIG. 5 will raise the rear side panel 14 in a counterclockwise direction to its upstanding or erected position, moving through an angular motion of substantially ninety degrees as shown in FIG. 9.

The opposing motion of the panels 12 and 14 is accomplished by the use of the gear train comprising gears 54 and 56 which have their respective shafts 52 and 30 supported in a block 55 mounted upon the frame 22 by bolts 57, see FIG. 9.

The movement of the link 48 is caused by pulling the handle 42 forward to open the cart for use and, conversely, by pushing the handle 42 into the channel 44, causing the handle to be in its stowage position, the side panels are caused to move from their erected position to their folded position. The handle is divided into two parts. A forward part 42A which is constructed to be drawn is completely free of the channel 44 and a rear portion 42B which remains within the channel upon extending the handle, see FIG. 6.

It will be noted that the handle 42 is also channel shaped and readily lends itself to supporting a push block 58 which is attached to the side of the handle portion 42B in spaced relationship thereto by bolts 60 and spacers 61. This is best illustrated in FIGS. 6, 7 and 8. The push block 58 is located outside the support channel 44 by virtue of spacers 61, projecting through a slot 62 in the channel 44 which extends forwardly in the channel by a sufficient distance to permit the push block 58 to function properly. A surface 58A is provided at the rear of the push block 58 to contact a first push pin 64, and a surface 58B at the front of the push block 58 to contact a second push pin 66, FIG. 8. The first push pin 64 is secured to lever 48 at the pivot point of attachment to the first crank arm 46, and the second push pin 66 is secured at the point of attachment to the second crank arm 50, both push pins constructed to project into the path of the push block 58 (FIG. 8) for movement thereby as will be described.

It will now become apparent that the side panels of the cart as shown particularly in FIG. 5 will move to their upstanding position (FIG. 4) upon manually pulling the handle out of the channel 44, that is, out of its stowage position. The handle is locked within the channel 44 by virtue of push block 58 being pressed against the first push pin 64 on the rear side and a leaf spring detent 68 which is attached to the frame and biased against the front end 69 of the handle, as shown in FIG. 5A, thereby locking the handle 42 within the channel 44. The leaf spring 68 is provided with a detent portion 68A and a handle portion 68B for manually releasing the spring. Upon releasing the spring, the handle 42 is unlocked for movement forwardly in the channel 44, toward its extended position, see FIG. 4. In advancing toward the extended position, the push block 58 moves away from the push pin 64, thereby releasing it for movement and after travelling forwardly, the second push pin 66 is engaged by the surface 58B of the push block 58 and moved a distance forward substantially equivalent to a ninety degree movement of the second crank arm 50 (FIG. 9) to erect the front side panel 12 to its upstanding position, and simultaneously raising the rear side panel 14 as a result of the link 48. At this point, the leaf spring 68 drops into a slot 70 disposed in the handle portion 42B to lock the handle in its extended position. The crank arm 50 is carried on the shaft 52 and is fastened to the adjacent gear 54 in any suitable manner, such as by pins 7!, FIG. 9, to drive the gear 54 as the arm 50 moves. Motion of gear 54 in turn drives the driven gear 56 (second gear) which is coupled to the front panel 14 for movement therewith.

As the front and rear side panels 12 and 14 move from their folded position (FIG. 5), the side edges 72 and 73 of the panel 14 engage and push against and act in a cam like manner to raise the side panels 18 and 20 respectively to their upstanding position against the bias of the torsion spring 38, and similiarly, the edges 74 and 75 of the panel 12 operate to raise the side panels 18 and 20. Panels 18 and 20 respectively are provided with edges 18A, 18B, and 20A and 20B, bent inwardly to form mechanical stops against which the panels 12 and 14 abut when in erected position.

The portion 42A of the handle 42 is pivotally attached to the handle portion 42B by a pin 76 for upward motion of the handle while the cart is pulled. The front end 69 of the handle portion 42A is provided with a suitably formed grip 78 for manually grasping the handle.

Figure 15:
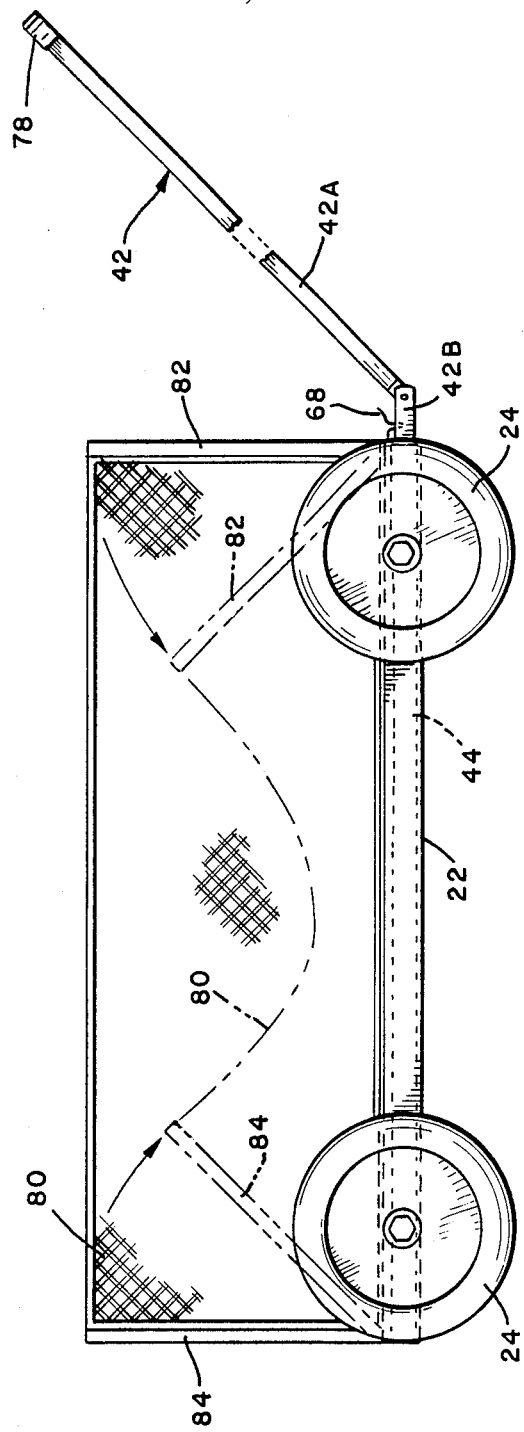
FIG. 15 is a side elevational view, showing a modification of the cart.

A modification of the present invention is shown in FIG. 15. The rigid side panels 18 and 20 are replaced by a suitable woven flexible netting material 80, such as nylon, which collapses as the respective front and rear side panels 82 and 84 are moved from their erected position to their folded position. This arrangement, as is apparent, eliminates journalling of two panels for movement and obviates also the need for springs and stops pertaining to such panels. In this latter arrangement, only a set of two substantially rigid side panels is used while the other two side panels comprise flexible material.

Another obvious modification concerns the provision of front wheels adapted to swivel in order that the cart can turn around corners more easily. This feature is well known in the art.

While there has been described and illustrated a preferred embodiment of my invention and certain modifications and changes have been described and or illustrated, it will be apparent to those skilled in the art that various further changes and modifications may be made without departing from the broad principle of this invention, which shall be limited only by the scope of the appended claims.

What is claimed is:

1. A cart comprising in combination:
   a flatbed;
   a plurality of foldable side panels disposed along the edge of said flatbed and mounted for being movable between a folded position when folded upon said flatbed and an erected position when upstanding from said flatbed;

a handle coupled to said flatbed for pulling said flatbed and panels and being reciprocatingly movable between a stowage position underneath said flatbed and an extended position in which said handle extends outwardly from said flatbed, and means coupling the reciprocatingly motion of said handle to said side panels for causing the position of said side panels to be responsive to the position of said handle.

2. A cart as set forth in claim 1, said side panels being in their folded position when said handle is in its stowage position, and said side panels being in their erected position when said handle is in its extended position.

3. A cart as set forth in claim 2, said plurality of side panels comprising two substantially rigid panels.

4. A cart as set forth in claim 2, said plurality of side panels comprising four substantially rigid panels.

5. A cart as set forth in claim 2, said plurality of side panels comprising two oppositely disposed rigid panels, and flexible material comprising the remaining side panels.

6. A cart as set forth in claim 2, said means coupling the motion of said handle to said side panels comprising link means connecting said handle with two oppositely disposed side panels for coupling the motion of said handle to said two oppositely disposed side panels for causing concomitant motion of said two panels.

7. A cart as set forth in claim 6, said link means coupled to a set of gears for causing said two side panels to move in opposite direction.

8. A cart as set forth in claim 6 and including two other side panels, bias means disposed for acting upon said latter side panels for urging them toward their folded position, and said latter side panels assuming their erected position by being acted upon by said two side panels coupled to said link means.

9. A cart as set forth in claim 8, and stop means disposed for stopping motion of said other side panels when they are in their fully erected position.

10. A cart as set forth in claim 2, each of said side panels moving through on angle of substantially ninety degrees from the folded position to the erected position.

11. A cart as set forth in claim 2, said means coupling the motion of said handle to two oppositely disposed side panels, and two other oppositely disposed side panels being spring biased and responsive to the motion of said first stated side panels.

12. A cart as set forth in claim 2, said stowage position including a channel for slidably receiving said handle therein.

13. A cart as set forth in claim 2, each of said side panels comprising said plurality of panels being supported by a respective rod, the rotation of which responsive to the operation of said means coupling causes the respective panel to move between said folded position and side erected position.

14. A cart as set forth in claim 2, said side panels when moving from their erected position to their folded position being rotated in a direction toward the center of said flatbed.

15. A cart as set forth in claim 3, and locking means disposed for locking said handle in its stowed position and in its extended position.

16. A cart as set forth in claim 15, said locking means including a spring detent and a slot coacting between said frame and said handle.

* * * * *